United States Patent [19]
Maejima et al.

[11] Patent Number: 5,327,568
[45] Date of Patent: Jul. 5, 1994

[54] APPARATUS FOR SUPPORTING GRAPHIC DATA DRIVEN PROGRAM DEVELOPMENT AND FOR DISPLAYING INSTRUCTION EXECUTION RESULTS SUPERIMPOSED ON THE GRAPHIC PROGRAM

[75] Inventors: Yukihito Maejima, Hachioji; Taihei Suzuki, Kodaira; Yasuyoshi Kaneko, Yokohama; Mitsuyuki Masui, Yokosuka; Susumu Kawaguchi, Yokohama; Hikaru Nakatani, Kamakura, all of Japan

[73] Assignees: Hitachi, Ltd., Tokyo; Hitachi Software Engineering Co., Ltd., Yokoyama, both of Japan

[21] Appl. No.: 559,240

[22] Filed: Jul. 30, 1990

[30] Foreign Application Priority Data

Jul. 31, 1989 [JP] Japan .................................. 1-196589

[51] Int. Cl.$^5$ .............................................. G06F 15/60
[52] U.S. Cl. .................................... 395/800; 395/100; 364/275.6; 364/977.1; 364/DIG. 2
[58] Field of Search ................ 395/800, 100, 144, 161; 364/191, 516

[56] References Cited

U.S. PATENT DOCUMENTS

| | | | |
|---|---|---|---|
| 4,315,315 | 2/1982 | Kossiakoff | 395/140 |
| 4,455,619 | 6/1984 | Masui et al. | 395/160 |
| 4,831,525 | 5/1989 | Saito et al. | 395/700 |
| 4,831,580 | 5/1989 | Yamada | 395/133 |
| 4,956,773 | 9/1990 | Saito et al. | 395/159 |
| 5,021,947 | 6/1991 | Campbell et al. | 395/700 |
| 5,099,413 | 3/1992 | Sakai | 395/700 |
| 5,129,046 | 7/1992 | Tanabe et al. | 395/100 |

FOREIGN PATENT DOCUMENTS 62-61130 3/1987 Japan .

OTHER PUBLICATIONS

Tanaka, The Journal of the Institute of Electronics and Communication Engineers of Japan, 1985, vol. 68, No. 7, pp. 777-778.

Primary Examiner—Thomas C. Lee
Assistant Examiner—Paul Harrity
Attorney, Agent, or Firm—Antonelli, Terry, Stout & Kraus

[57] ABSTRACT

An apparatus for supporting development of a graphic data driven program includes a data driven mechanism enabling instructions of the data driven program to be executed whenever all input data necessary for executing the instructions is available. The apparatus includes a terminal device for inputting and displaying a graphic data driven program, an input transforming section for transforming the inputted graphic data driven program into an intermediate file by referring to an instruction information data base, a wiring table transforming section for transforming the inputted graphic data driven program into a wiring table of instructions expressed in text which is independent of a target machine by referring to the intermediate file, a compile section for transforming the wiring table into an instruction template described with a language depending on the target machine, an instruction execution section for executing the instruction template, an instruction execution displaying section for displaying results of executing the instruction template superposed on the displayed graphic data driven program, and an instruction information tracing section for comparing actual results of executing the instruction template stored in a traced information file with correct results of executing the instruction template stored in a correct data base.

15 Claims, 14 Drawing Sheets

HEADER INFORMATION RECORD

INSTRUCTION NODE INFORMATION RECORD

ARC INFORMATION RECORD

```
 210   211  213        212
  1    ADR      PACKETN ;
  2    READ     STRUCTA    1-0        ;
  3    READ     STRUCTB    1-0        ;
  4    EQ       3-0        0          ;
  5    ADD      2-0        2-1
                * 4-0;
```

F I G. 10
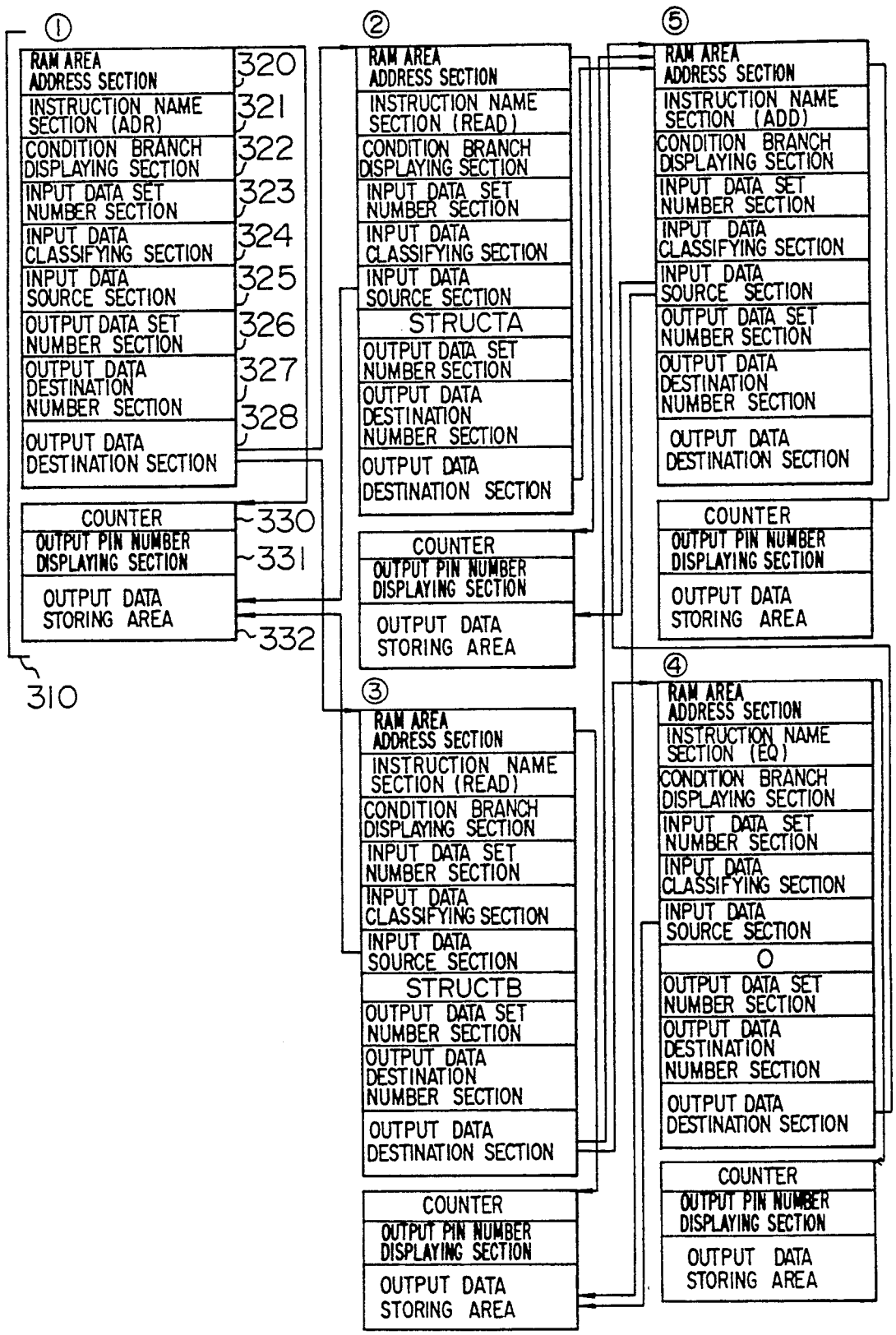

F I G. 11
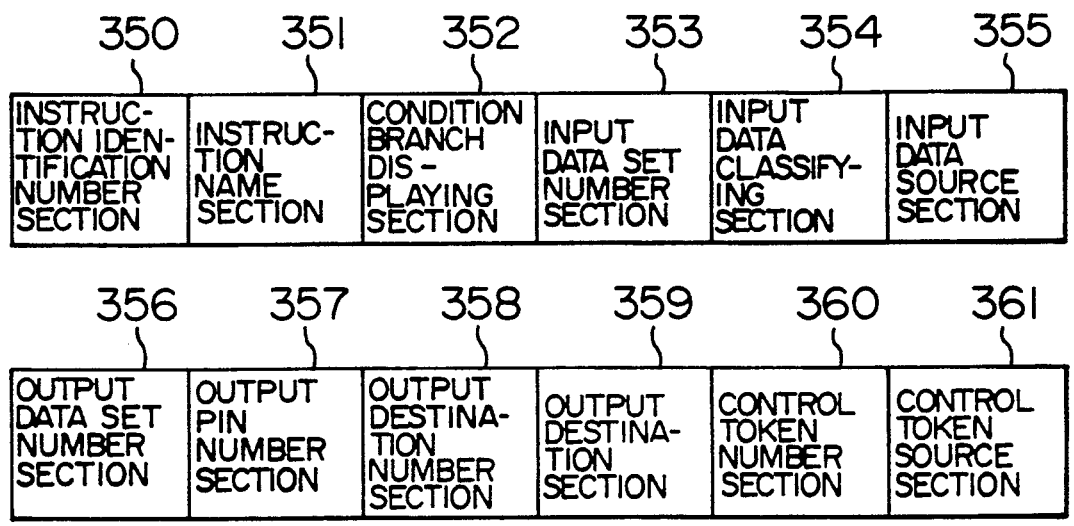
F I G. 13
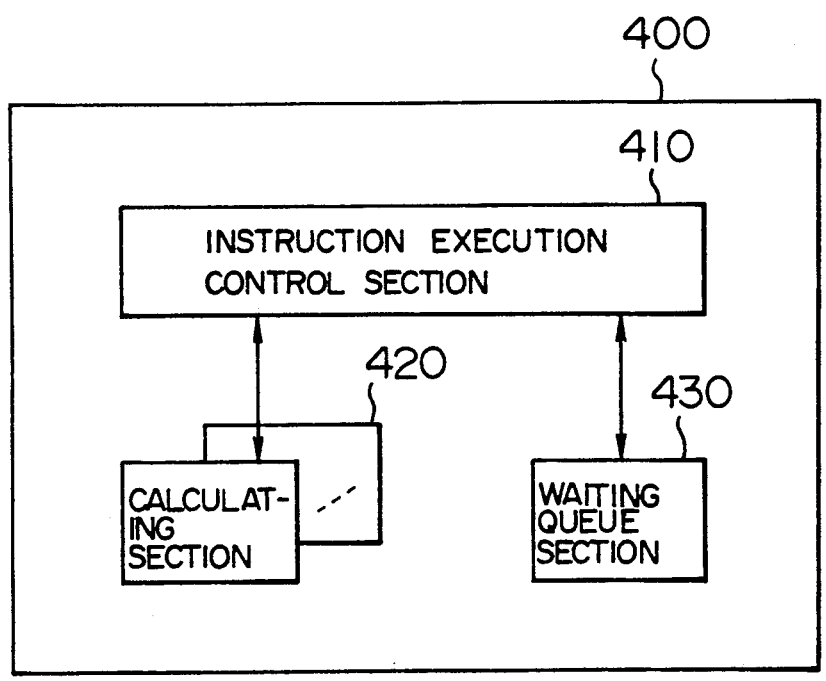

FIG. 16A  HEADER INFORMATION RECORD
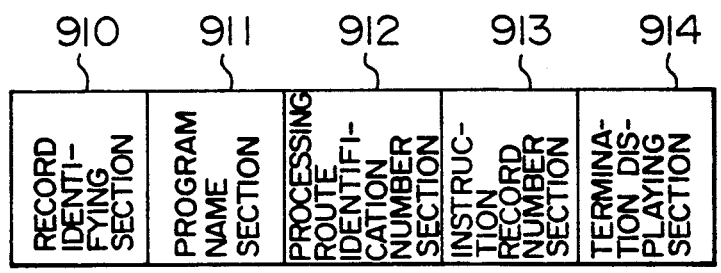
FIG. 16B  INSTRUCTION NODE INFORMATION RECORD
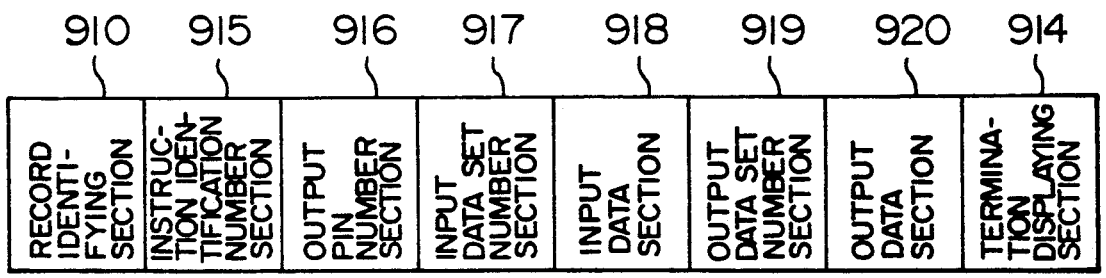

APPARATUS FOR SUPPORTING GRAPHIC DATA DRIVEN PROGRAM DEVELOPMENT AND FOR DISPLAYING INSTRUCTION EXECUTION RESULTS SUPERIMPOSED ON THE GRAPHIC PROGRAM

BACKGROUND OF THE INVENTION

The present invention relates to a method for supporting development of graphic data driven programs and an apparatus for realizing the same, and more particularly to a method for inputting graphic images or patterns, transforming instructions into respective executable instruction templates, executing and tracing instructions and displaying trace results, as well as an apparatus for realizing the same in the design of data driven programs expressed by graphic description.

As an example of methods for testing a program designed by using graphic description at the detailed design level of the program, there is known a method using a structure chart, as described, e.g., in JP-A-62-61130. Although the method using this structure chart is suitable for describing a control flow of instructions, it is not suitable for expressing parallel description of a data flow, dependence relations of modules in the program, a control flow, etc. For this reason, when it is tried to model the program by the structure chart, it is necessary to define clearly interfaces between different modules used within the program by using variables and further to describe execution processes sequentially without errors. In addition, documents other than the structure chart are necessary for describing the relation between different modules and the data flow.

On the other hand, when the program is modeled by using data driven computation (data flow), the control flow and the data flow exist simultaneously and since the control flow and the data flow can be described graphically, this method is better than the structure chart from the point of view of the visual recognition. Heretofore, as described e.g., in the Journal of the Institute of Electronics and Communication Engineers of Japan, Vol. 68, No. 7, July 1985, pp. 773–778 (in Japanese), in order to facilitate the input of a data driven program in a computer, it is usual to use a language in text expression on the basis of the single assignment rule. However, by the text expression it is difficult to visually recognize the program, and the graphic expression, which is one of the features of the data driven program, can not be efficiently used. Further, although a graphically described language has been proposed by some authors, it is necessary by this method to input directly a program in graphic form at the detailed design level and to provide easily in a simple manner a function of debugging directly the program described in graphic form.

Still further, in U.S. Ser. No. 386,198 filed on Jul. 28, 1989, now U.S. Pat. No. 5,129,046, a technique has been proposed by which a source list of a wiring table (described later) expressed in text is transformed inversely into a data driven program described in graphic form.

SUMMARY OF THE INVENTION

It is usual to use a graphic editor for inputting a data driven program described in graphic form into a computer or displaying the same. However, on the other hand, it should be transformed into a program expression format for dealing with it efficiently within the computer. That is, it is desirable that the graphic expression is transformed into the text expression, which is further transformed into instructions depending on the target machine, and the instructions are executed efficiently and that the result thus obtained is displayed on a program expressed in graphic pattern form.

However, in practice, since these treatment processes exist independently from each other, transformations and verification works for linking the different treatment processes are manually performed and these manual works constitute an overhead for the program design. For example there are problems that the graphic data driven program and the text expression within the computer are not in accordance with each other and that although the program itself is described in graphic pattern form, the designer should debug the program always in the text format.

An object of the present invention is to provide a method for supporting development of graphic data driven programs and an apparatus for realizing the same, by which it is possible to input a graphic data driven program directly from a graphic terminal to the computer in a program design and to prepare, execute, test and verify the program on a graphic terminal.

In order to achieve the above object, according to an aspect of the present invention, in the support of development of graphic data driven programs, a graphic data driven program expressing the operation of a program in the thinking process of the designer with a high fidelity is inputted directly into a computer by means of a graphic editor, which is once transformed into a text format which doesn't depend on the target machine within the computer, and the program described in the text format is transformed automatically into an instruction which can be executed by the target machine. Then the instruction obtained by the transformation is executed efficiently and the execution result is displayed directly on the graphic data driven program.

In the present support of development, in order to facilitate the input of graphic patterns through a terminal, the description format of the data driven program is preferably a format described by using e.g., nodes representing instructions, directed arcs indicating flows of data between different instruction nodes, the input pin number showing the position of inputted data, the output pin number showing the position of outputted data, the name indicating the function of the instruction nodes, the instruction identification number for identifying a specified instruction among a plurality of instructions, the data name or numerical value inputted directly in the instructions, etc. Further graphic information such as the shape of the instruction nodes, the number of inputted and outputted data sets, etc., is preferably registered for every instruction as the data base. When the instruction name and the arrangement point of the instruction node are inputted by the designer, in the present support of development, at first the instruction data base is referred to; the size of the node is determined by the shape of the instruction node corresponding to the relevant instruction name and the number of input and output pins; and the instruction name and the instruction node, to which the input pin number and the output pin number are added, are arranged automatically at specified arrangement points on a terminal. Next the instruction identification number and data, which are inputted directly in the instruction node, are inputted in the form of a series of letters and numerals and the directed arc of the flow of data transmitted and received between different instruction nodes is formed by specifying the output pin number of the instruction node acting as the starting point and the input pin number of the instruction node acting as the ending point. The data driven program is prepared in this way.

The data driven program inputted into the computer in the present data driven program development supporting apparatus is transformed into an intermediate file including information such as the display position on the screen of the terminal, the shape, the name, inputted data, etc., preferably for every instruction node and directed arc and further transformed into a wiring table in the text expression form, which doesn't depend on the computer, on the basis of this intermediate file. This wiring table is described by using the instruction identification number, the node name, and connection information of the input and output pins. Then it is transformed into the instruction template described by using a language, by which the instruction can be executed, i.e. a language depending on the target computer, and the instruction template is simulated on the computer in the present apparatus for supporting development of data driven programs.

Further, in the course of the simulation of the template, in order to display the process on the screen of the terminal, preferably the graphic information stored in the intermediate file is obtained from the instruction identification number and it is displayed that the corresponding instruction has been executed. Further the order of execution of the instructions collected in the course of the simulation of the instruction template and the information of input and output data of the instructions are stored in the file and displayed on the screen of the terminal according to an instruction of the designer. As a verification function of the program, preferably the order of execution of the instructions and the information of input and output data of the instructions are previously stored in the file for every function of the program-as correct data. In the case where the program is modified, it is possible to inform the designer of the fact that each of the functions works correctly, by collecting the information described above for every function to compare it with the correct data.

As described above, by using the method for supporting development of data driven programs or the apparatus for realizing the same according to the present invention, the designer can develop a data driven program expressed in graphic pattern form in a development environment consistent from the input of the program to the test thereof, without depending on the target computer. Further, even if the language of the target computer is changed, the input and output interface for the program remains unchanged and only the process for transforming the wiring table into the instruction template may be changed.

By using the method for supporting development of graphic data driven programs or the apparatus for realizing the same according to the present invention, a prior art detailed specification of the program, in which different steps in the control flow are described one after another, is improved into a detailed specification, in which the control flow and the data flow are described two-dimensionally and parallelly in graphic pattern form. Thus, it is possible to grasp the outline of the program specification. Further, owing to the fact that the program can be described in graphic form, it is possible to give the program a deep significance at a high level. For example, it is possible to describe easily whether different programs have a same function or different functions, by means of the shape, the size, etc., and thus it is possible to easily analogize unknown facts. It is possible also to efficiently communicate with other designers by using graphic description.

Furthermore, the program itself is a dynamic object and in order to know the program in detail, it is necessary to examine the actual operation thereof. However, by using the graphic description it is possible to display the operation of the program in animation. For example, it is possible also to display the process of execution of a dynamic instruction on the screen of the terminal during the execution of the program and thus the control sequence and data can be monitored directly and dynamically.

In the design of the program, in order to utilize efficiently the judging capacity of the designer, it is inevitable to construct a processing system supporting the graphic description consistently from the input to the test step and it is possible to intend to raise further the efficiency of the development of programs by using the apparatus supporting development of graphic data driven programs according to the present invention.

BRIEF DESCRIPTION OF THE DRAWINGS

FIG. 10 is a scheme showing an example of the construction of the instruction template;

FIG. 11 is a scheme showing an example of the construction of the editing table of connection information;

FIG. 13 is a scheme showing an example of the construction of the instruction executing section;

FIGS. 16A and 16B are schemes showing an example of the record format of the trace information file.

DESCRIPTION OF THE PREFERRED EMBODIMENTS

Figure 1:
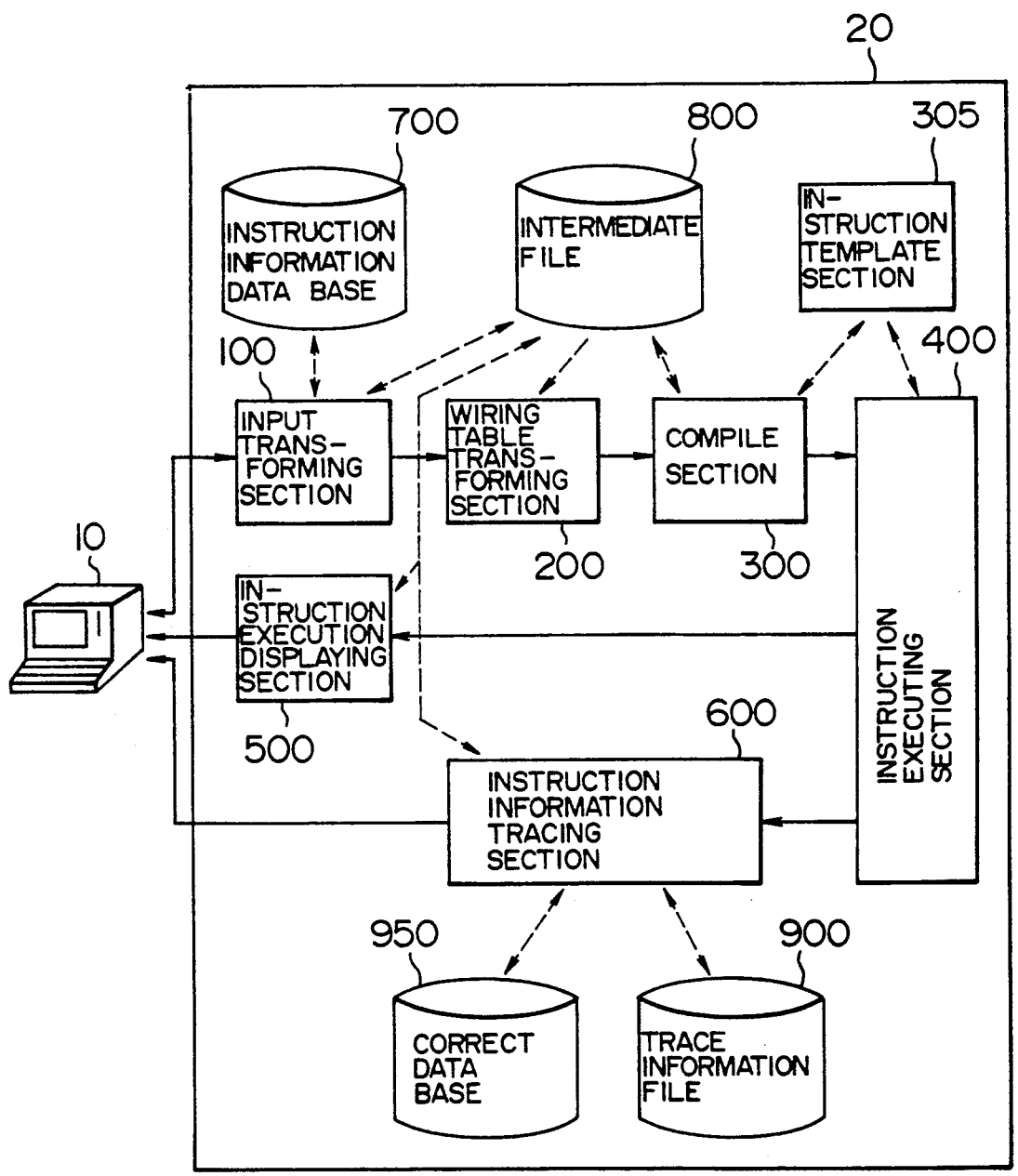
FIG. 1 is a block diagram showing the construction of an embodiment of the present invention.

Hereinbelow an embodiment of the present invention will be explained, referring to the drawings.

FIG. 1 is a block diagram showing the construction of an embodiment of the apparatus supporting development of graphic data driven programs according to the present invention. In FIG. 1, reference numeral 10 is a terminal device displaying a graphic data driven program inputted by means of icons and/or a mouse and 20 is a processing apparatus for supporting development of graphic data driven programs. The processing apparatus 20 is composed of an input transforming section 100; a wiring table transforming section 200; a compile section 300; an instruction template section 305; an instruction executing section 400; an instruction execution displaying section 500; an instruction information tracing section 600; an instruction information data base 700; an intermediate file 800; a trace information file 900; and a correct data base 950. These processing sections (100, 200, 305, 400, 500, 600) are arranged in a main storage memory of the processing apparatus 20.

The input transforming section 100 transforms various graphic data driven instruction nodes and directed arcs inputted from the screen of the terminal 10 into connection information between different instructions composed of the display position, the shape, the instruction identification number, the instruction name, the number of inputted data sets, the sort of the inputted data sets, the source of the inputted data sets, the number of outputted data sets, the number of outputted data destinations, etc., which information is stored in the intermediate file 800. The wiring table transforming section 200 transforms the connection information stored in the intermediate file 800 into a wiring table described in the text expression format. The compile section 300 transforms the wiring table transformed by the wiring table transforming section 200 into an instruction template described in an executable machine language, which is outputted to the instruction template section 305. The instruction executing section 400 executes the instruction template described in the machine language generated in the compile section 300 in the data driven computation and displays the execution process of the instruction on the screen of the terminal 10 through the instruction displaying section 500.

When the trace of the instruction is instructed to the instruction executing section 400 through the terminal 10, the instruction executing section 400 transmits trace information such as the instruction identification number, the name of the instruction, the inputted data information, the outputted data information, etc., to the instruction information tracing section 600 for every execution of the instruction. The instruction information tracing section 600 stores the trace information received from the instruction executing section 400. The trace information stored in the trace information file 900 is displayed on the terminal 10 according to an instruction from the terminal 10.

Further, the correct data base 950 is one, in which the trace information of the instruction, in the case where the apparatus works correctly, is stored for every processing route. In the case where the graphic data driven program is corrected or modified, by specifying the program name and the processing route identification number identifying the processing route through the terminal 10, the instruction information tracing section 600 compares the trace information file 900 of the graphic data driven program stored for every processing route with the correct data base 950 and the result obtained by this comparison is displayed on the terminal 10. In this way, even if corrections, modifications, etc., take place in the graphic data driven program, it is possible to verify whether the existing functions which don't relate to the corrections or the modifications work correctly or not.

As described above, it is possible for the designer to obtain support by consistent graphic description from the program design to the test by means of the apparatus for supporting development of data driven programs according to the present invention.

Next the graphic data driven program, the instruction information data base 700, the intermediate file 800 and the wiring table described above will be explained.

Figure 2:
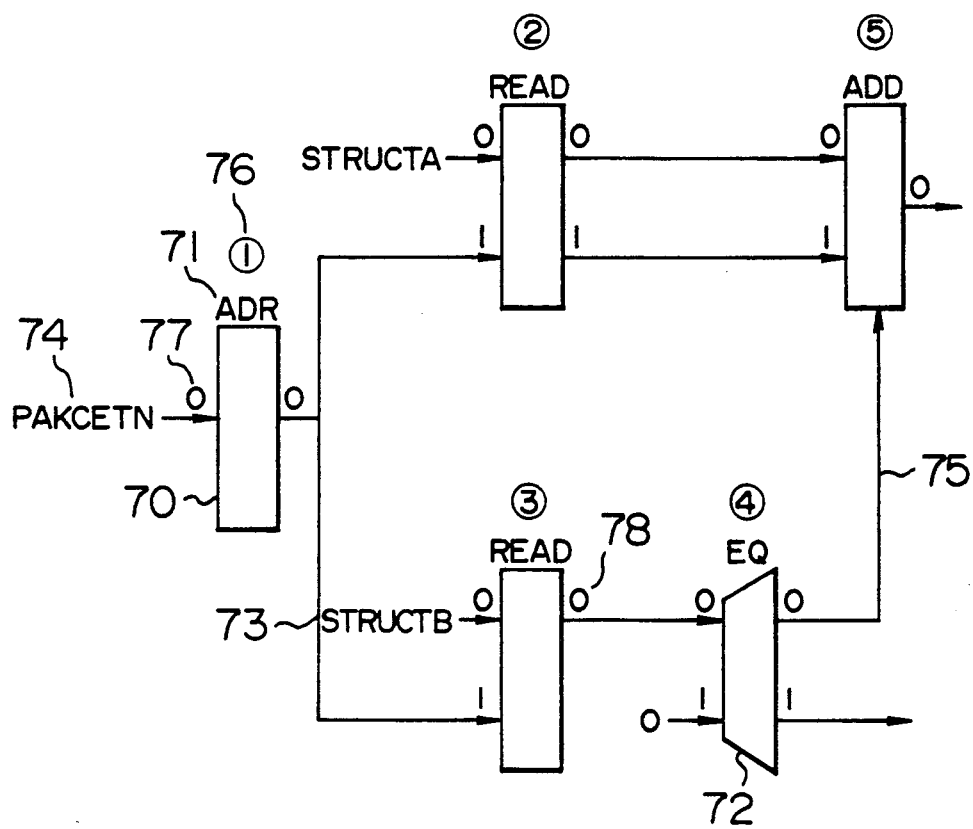
FIG. 2 is a scheme showing an example of description of a graphic data driven program.

FIG. 2 shows an example of the description of the graphic data driven program dealt with by the apparatus for supporting development of graphic data driven programs according to the present invention. An instruction for executing a basic calculation is represented by a rectangular node 70 and the instruction name 71 is inscribed above that node. A conditional branching type instruction, by which the result is outputted through a specified output pin depending on the calculation result, is represented by a trapezoidal node 72. The directed arc entering the instruction node from the left represents an input, while the directed arc going out from the instruction node from the right represents an output. The data, which are not transmitted and received between different instructions, i.e. the data inputted directly in the instruction, are described as input data 74. A control token 75, which is not input data, but defines the order of execution of the instruction, enters the instruction through the bottom. Further, in order to facilitate the transformation into the wiring table, the instruction identification number ((1) to (5)) 76 indicating numbers proper to the instruction for identifying them, the input pin number 77 and the output pin number 78 are inscribed for each of the instructions. A plurality of input pin numbers 77 and output pin numbers 78 can be given to a same instruction node.

Figure 3:
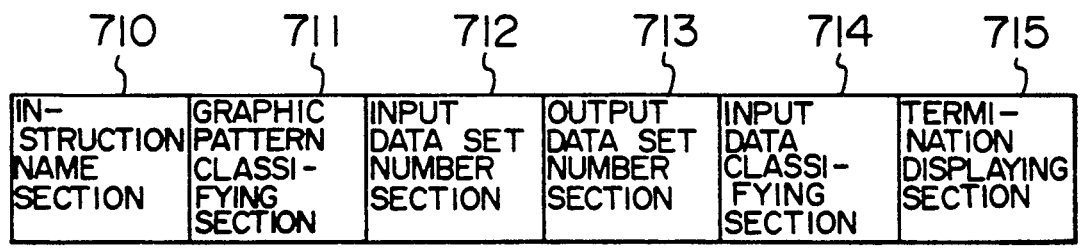
FIG. 3 is a scheme showing an example of the recording format for the instruction information data base.

FIG. 3 shows an example of the record format of the instruction information data base 700. The record information is prepared for every instruction name. The record format is composed of an instruction name section 710; a graphic classifying section 711 indicating the shape of the instruction node displayed on the screen of the terminal 10, e.g., a rectangle, a trapezoid, etc.; an input data set number section 712 representing the number of input pins on the instruction node indicated by the instruction name; an output data set number section 713 representing the number of output pins on the instruction node indicated by the instruction name; an input data classifying section 714 indicating whether each of the input data sets on the instruction node indicated by the instruction name takes over the data set of the preceding instruction, or it is inputted directly as a series of letters and numerals, or both of them are possible; and a termination displaying section 715 indicating the termination of one record.

When the instruction node is inputted through the terminal 10 by this instruction information data base 700, the input transforming section 100 accesses the record information indicated in FIG. 3 in the instruction information data base 700 indicated by the instruction name. In this way, since verification is effected on the compatibility of the shape of the inputted instruction node, the input data set number, the output data set number, and the input data classification, it is possible to intend to raise the efficiency of the error detection at the program input.

Figure 4A:
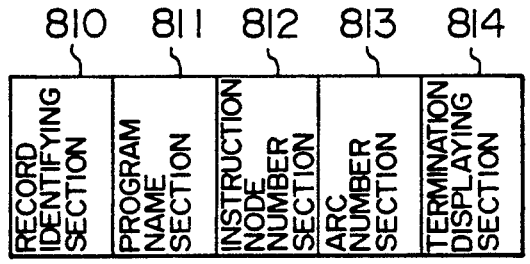
FIGS. 4A, 4B and 4C are schemes showing different examples of the recording format for the intermediate file.
Figure 4B:
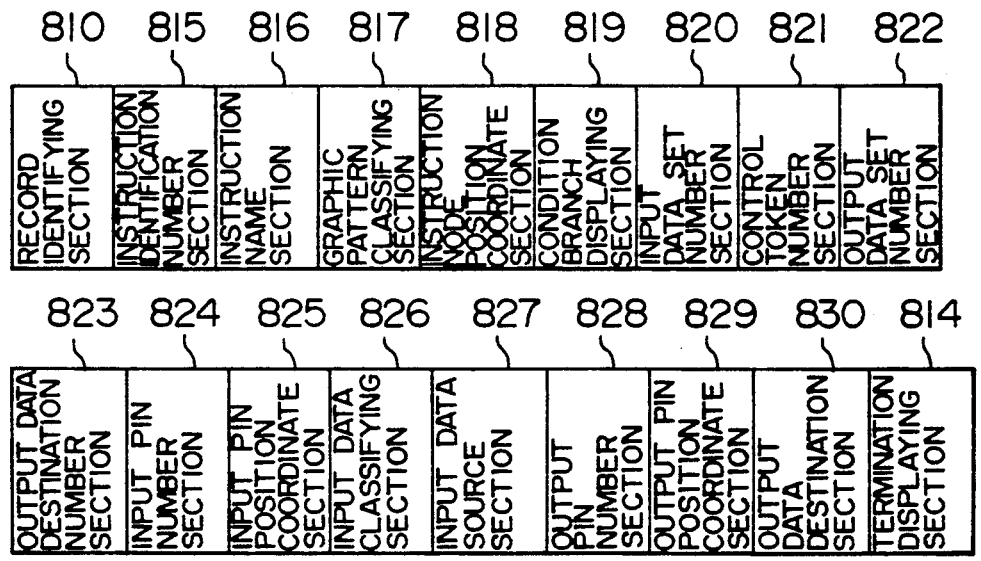
Figure 4C:
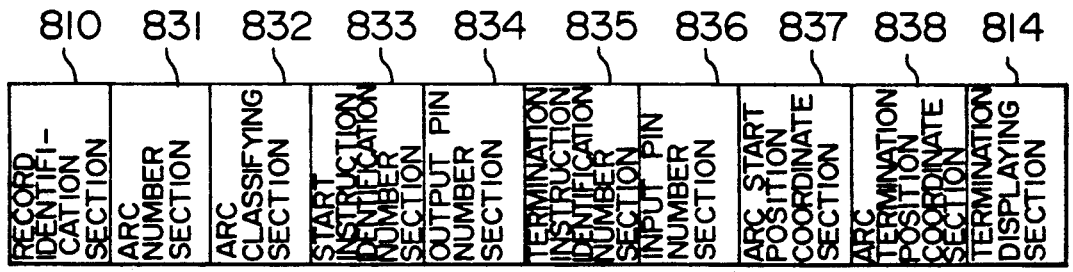

Further, the input transforming section 100 produces the intermediate file 800 including graphic description and wiring information by means of the graphic data driven program instruction information data base 700. FIGS. 4A, 4B and 4C show an example of the record structure stored in the intermediate file 800. The record structure can be divided roughly into three parts, i.e. header information record (FIG. 4A), instruction node information record (FIG. 4B) and arc information record (FIG. 4C).

As indicated in FIG. 4A, the header information record is composed of a record identifying section 810 for identifying the header information record, the instruction node information record and the arc information record; a program name section 811 indicating the name of the inputted program; an instruction node number section 812 indicating the number of instruction nodes described within the program; an arc number section 13 indicating the number of arcs described within the program; and a termination displaying section 814 indicating the termination of the record.

As indicated in FIG. 4B, the instruction node information record is composed of a record identifying section 810; an instruction identification number section 815 which indicates a proper number given to each of the instructions for identifying the instructions; an instruction name section 816 showing the name of each of the instructions; a graphic pattern classifying section 817 indicating the shape of the graphic pattern representing each of the instructions; an instruction node position coordinate section 818; a condition branch displaying section 819 indicating whether each of the instruction nodes has a condition branch function; an input data set number section 820 indicating the number of input data sets of each of the instruction nodes; a control token number section 821 indicating the number of control tokens of each of the instruction nodes; an output data set number section 822 indicating the number of output data sets of each of the instruction nodes; an output data destination number section 823 indicating the number of destinations which should be informed of the fact that the output data have been prepared; an input pin number section 824 indicating the pin number for the input data; an input pin position coordinate section 825 indicating the display position of the input pins on the screen of the terminal; an input data classifying section 826 indicating whether the input data take over the input data of the preceding instruction or they are directly inputted; an input data source section 827 indicating the source of the input data; an output pin number section 828, indicating the pin number for the output data; an output pin position coordinate section 829 indicating the display position of the output pin on the screen of the terminal; an output data destination section 830 for informing the succeeding instruction of the fact that the output data have been prepared; and a termination displaying section 814 indicating the termination of the record.

In the case where there are a plurality of input data sets, the same number of input pin number sections 824, input pin position coordinate sections 825, input data classifying sections 826 and input data source sections 827 as the number of input data sets indicated by the input data set number section 820 are prepared. In the same way, in the case where there are a plurality of output data sets, the same number of output pin number sections 828, output pin position coordinate sections 829 and output data destination sections 830 as the number of output data sets indicated by the output data set number section 822 are prepared. Here, in the case where the sort of input data indicated by the input data classifying section 826 is directly inputted data, the input data themselves are stored in the input data source section 827 and in the case where the input data of the preceding instruction is taken over, the arc number given by the input transforming section 100 for every directed arc is stored in the input data source section 827. In the same way, the arc number is stored also in the output data destination section 830. This arc number can be transformed into either the instruction identification number and the output pin number at the starting point of the arc or the instruction identification number and the input pin number at the ending point of the arc stored in the arc information record described later. Further, in order to distinguish the pin number of the control token from the input pin number, it is referred to by 'FF'.

As indicated in FIG. 4C, the arc information record is composed of a record identification section 810; an arc number section 831 specifying the number of the arc; an arc classifying section 832 specifying the sorts of lines; a start instruction identification number section 833 indicating the instruction identification number at the starting point of the arc; an output pin number section 834; a termination instruction identification number section 835 indicating the instruction identification number at the ending point of the arc; an input pin number section 836; an arc start position coordinate section 837; an arc termination position coordinate section 838; and a termination displaying section 814 indicating the termination of the record. Further, in the case where the arc is composed of a plurality of line segments, the same number of arc start position coordinate sections 837 and arc termination position coordinate sections 838 as the number of line segments are prepared. The header information record indicated in FIG. 4A and the instruction node information record indicated in FIG. 4B may be disposed in successive addresses in order to make them correspond with each other, or the instruction node information record address section in which the heading address of the instruction node information record is stored may be disposed between the arc number section 813 and the termination displaying section 814 in the header information record.

Now the writing of a program by means of the apparatus for supporting the development will be explained.

Figure 5:
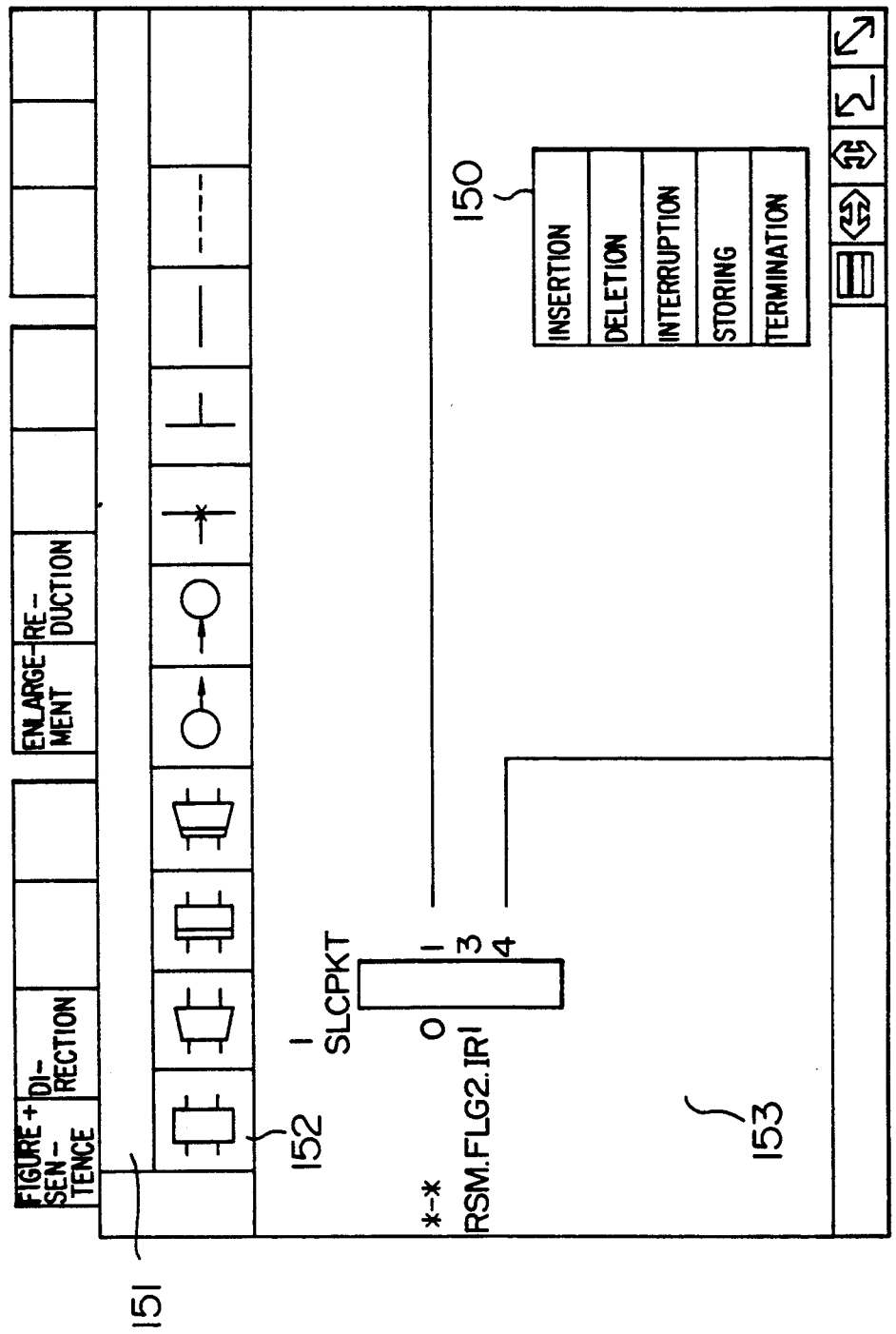
FIG. 5 is a scheme showing an example of the editing region displayed on the screen of the terminal.

FIG. 5 shows an example of the editing region displayed on the screen of the terminal. This editing region is composed of a command indicating section 150 indicating a command according to a pop-up menu; a trace information input section 151 through which guidance display for the trace as well as a series of numerals and letters such as input data of a processing instruction node, the name thereof, etc., are inputted; a graphic symbol displaying section 152 displaying a graphic symbol which can be described by the present apparatus for supporting development; and a trace region section 153 which writes out a scheme of data flow as indicated in FIG. 2 by connecting different instruction nodes by using the arrangement of the instruction node and the directed arcs. As symbols displayed on the graphic symbol displaying section 152 there are symbols such as instruction nodes, arcs, confluences, branches, etc.

Figure 6:
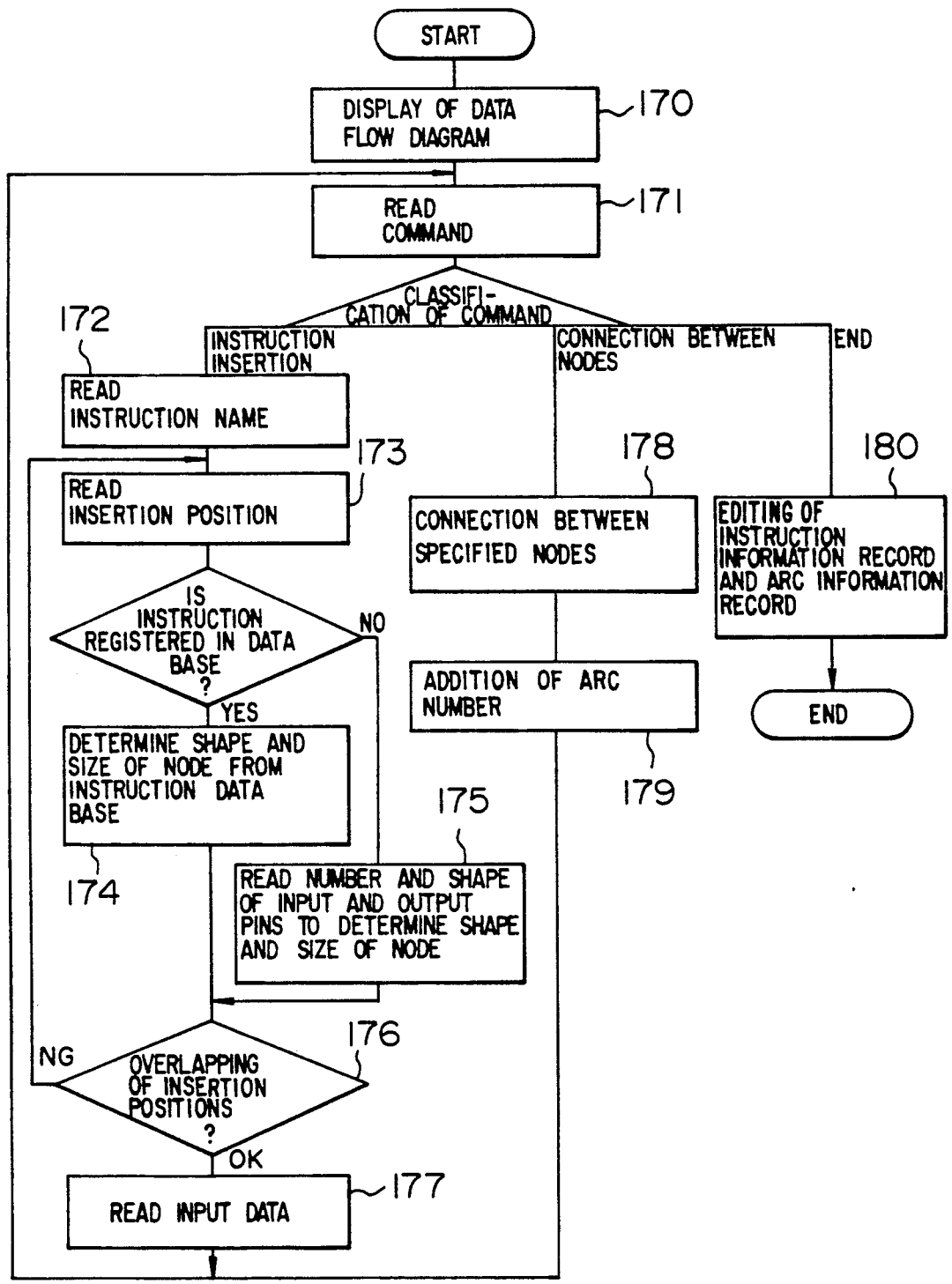
FIG. 6 is a scheme showing an example of the processing flow of the input transforming section.

FIG. 6 shows a processing flow chart of the input transforming section 100. At first, the tracing processing will be explained, referring to this flow chart. Indication of the input is effected by means of a mouse and a key board.

At first, the input transforming section 100 reads out the program name inputted by the designer. Then it reads out the header information record, the instruction node information record and the information record corresponding to the program name from the intermediate file 800 and displays a scheme of data flow in the trace region section 153 of the terminal on the basis of these record information sets (Step 170). If there is no record corresponding to the program name in the intermediate file 800, the input transforming section 100 secures newly a header information record and displays the trace region section 153 on the terminal.

When a command indicating an instruction node insertion specified by the command indicating section 150 by means of the mouse is read out (Step 171), the input transforming section 100 performs a guidance to input the instruction name to make the trace information input section 151 display it. After having read out the instruction name in the form of a series of letters through the key board (Step 172), the input transforming section 100 reads out the insertion position of the instruction name within the trace region section 153 indicated by the mouse (Step 173). Further the input transforming section 100 searches the instruction information data base 700 by using the instruction name as the key to determine the shape of the instruction node by means of the graphic pattern classifying section 711 in the record information corresponding to the instruction name. Then it determines the size of the instruction node by using the input data set number section 712 and the output data set number section 713 and adds the instruction name and an input pin number and an output pin number to each of the input pins and the output pins (Step 174). For the instructions whose names are not registered in the instruction information data base 700, the input transforming section 100 reads out the symbols of the instruction nodes selected by the graphic symbol displaying section 152. After having read out the number of input pins and the number of output pins inputted by the trace information inputting section 151, the input transforming section 100 determines the size of the instruction nodes on the display screen and adds the instruction name and an input pin number and an output pin number to each of the input pins and the output pins (Step 175).

After it has been judged that the display of the instruction node is possible at the insertion position for the instruction node indicated by means of the mouse within the trace region section 153 (Step 176), the instruction node is displayed. In the case where the display of the instruction node is impossible, i.e. when an instruction node exists already in the indicated insertion position, it is displayed again in the trace information inputting section 151 to indicate the insertion position and procedure returns to the step of reading out the insertion position.

When the display of the instruction node is terminated, the input transforming section 100 reads out the instruction identification number determining unequivocally the instruction node and the input data, which are a series of letters inputted directly in the instruction node (Step 177). At this time, concerning the input data, it is checked whether the series of letters or numerals can be inputted directly in the specified input pin or not, while referring to the input data classifying section 714 within the instruction information data base 700. If no errors are found, the processing of the instruction insertion is terminated and procedure returns to the step of reading out the instruction (i.e. instruction input waiting state).

Now the connection processing between different nodes will be explained.

When the designer selects a command indicating the connection processing between different nodes, receiving this instruction, the input transforming section 100 reads out an indication classifying the arcs (e.g. full line or broken line) from the graphic symbol displaying section 152. Then it reads out the output pin position of the instruction node at the starting point and the input pin position at the ending point, which should be connected, within the trace region 153, and the connection between the input and the output pin specified by the selected arc classification (Step 178). At this time, the arc number is added automatically, in order to identify the arc (Step 179).

Since the deletion of instruction nodes and arcs can be effected in the same way, explanation thereof will be omitted.

When the designer selects a command indicating the termination of the trace, receiving this instruction, the input transforming section 100 counts the number of instruction nodes and the number of arcs from the trace information and the instruction node number section 812 and the arc number section 813 in the header information record are updated. Further, the instruction node information record and the arc information record are edited for all the instruction nodes and all the arcs of the object of the trace from the trace information (Step 180). The correspondence between the instruction node information record and the arc information record is made as follows. After the instruction identification number at the starting point of the arc has been extracted from the start instruction identification number section 833 indicated by the arc number, the output pin number at the starting point of the arc is extracted from the output pin number section 834, the instruction node information record corresponding to the instruction identification number stated above is obtained and the arc number stated above is set at the output data destination section 830 corresponding to the output pin number stated above. In the same way, the instruction identification number at the ending point is extracted from the termination instruction identification number section 835, the input pin number is extracted from the input pin number section 836, the instruction node information record corresponding to the instruction identification number stated above is obtained, and the arc number stated above is set at the input data source section 827 corresponding to the input pin number stated above. These processings are effected for all the arcs.

Further, the values for the arc start coordinates and the arc end coordinates are set in the arc start position coordinate section 837 and the arc end position coordinate section 838 from the arc position coordinates on the terminal. However, in the case where the arc is described with a plurality of segments, a predetermined number of arc start position coordinate sections 837 and arc end position coordinate sections 838 are set.

Figure 9:
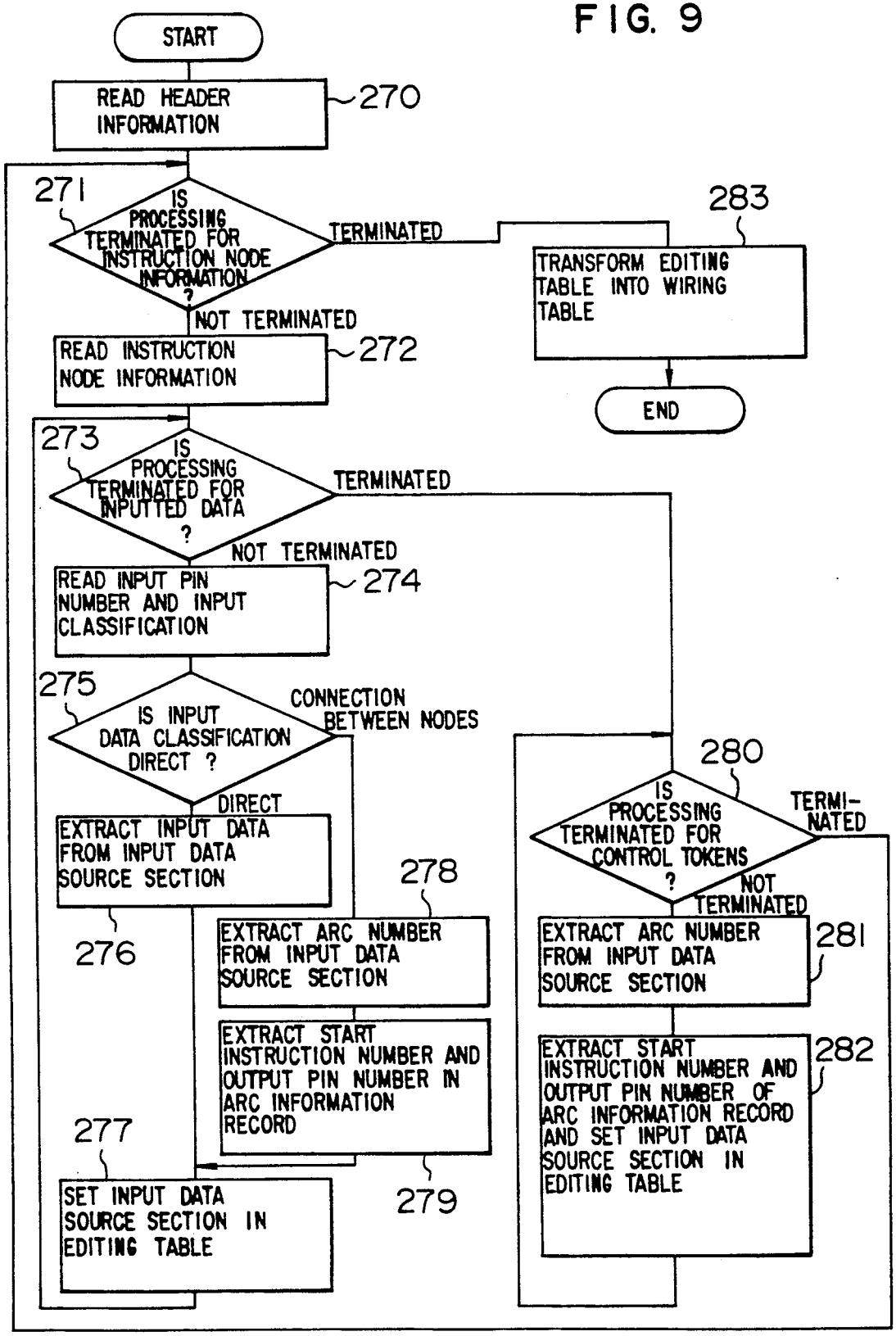
FIG. 9 is a scheme showing an example of the processing flow of the wiring table transforming section.

Next the processing for preparing an .equivalent wiring table from the data driven program described in graphic form, will be explained referring to FIGS. 7, 8 and 9.

Figures 7, 8:
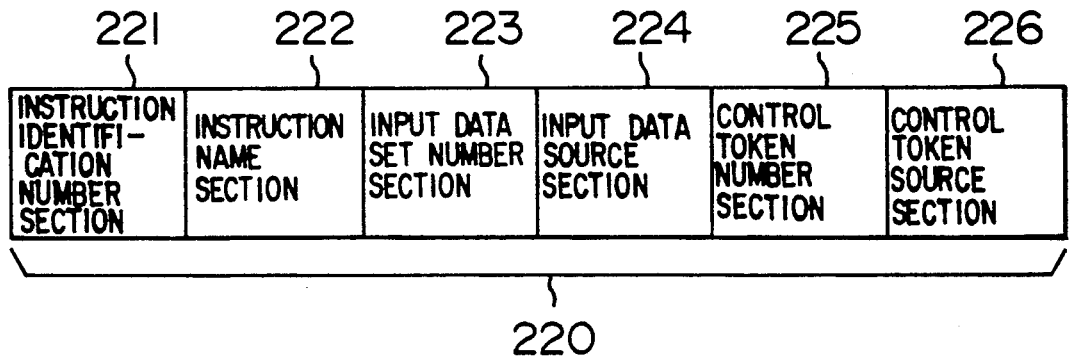
FIG. 7 is a scheme showing an example of the wiring table.
FIG. 8 is a scheme indicating the construction of an editing table transforming input data into the wiring table.

FIG. 7 shows an example of the wiring table obtained by transforming FIG. 2 by using a wiring table transforming section 200. The wiring table is described with an instruction identification number describing section 210 describing identification numbers of instructions; an instruction name describing section 211 describing names of instructions; an input data describing section 212 describing input data; a control token describing section 213 indicating control tokens. The termination display of an instruction is indicated by ';'. Further the input data describing section 212 corresponds to input pin number 0, input pin number 1, —successively from the left, whose contents are described with the instruction identification number of the preceding instruction serving as the input and with the output pin number thereof. For example, the input for instruction identification number 2 and input pin number 1 in the figure is "1-0" and this means that the output data for instruction identification number 1 and output pin number 0 are used as the input data for input pin number 1. Further, similarly to the input data, the control token is described with the instruction identification number and the output pin number of the preceding instruction and marked by '*'. In the case where a plurality of control tokens exist for a same instruction, they are separated by ','.

By adopting such an expression format for the wiring table, it is possible to transform easily and perfectly equivalently the data driven program described in graphic form into that described in text and to effect easily the processings with the computer.

FIG. 8 shows an example of the structure of the editing table for transforming the information into the wiring table, referring to the header information record, the instruction node information record and the arc information record described previously. The editing table 220 is composed of an instruction identification number section 221; an instruction name section 222; an input data set number section 223; an input data souce section 224; a control token number section 225; and a control token source section 226 for every instruction.

The input data source section 224 is prepared, corresponding to the input pins of the instruction, in the order of increasing numbers. In the input data source section 224 are stored either directly the input data themselves or information described with the instruction identification number outputting the data serving as the input data and the output pin number of the instruction node indicated by the instruction identification number. The format thereof is "instruction identification number "—" output pin number" i e the instruction identification number and the output pin number connected through a hyphen. Also concerning the conrol token, the control token source section 227 indicating from which output pin of the instruction node the control token is received is described with the format of "instruction identification number "—" output pin number", similarly to the input data source section 224.

Now the processing flow of the wiring table transforming section 200 preparing the editing table for transforming the inputted information into the wiring table referring to the header information record, the instruction information record and the arc information record will be explained referring to FIG. 9.

At first, the wiring table transforming section 200 reads out the header information record and obtains the number of instruction nodes and the number of arcs (Step 270). Next, after having judged whether the processing is terminated or not for all the instruction record (Step 271), if it is not terminated, one record is read out from the node information record and data such as the instruction identification number, the instruction name, the number of input data sets, the number of control tokens, etc. are read out (Step 272), which are Set in the instruction identification number section 221, the instruction name section 222, the input data number section 223, and the control token number section 225, respectively. These processings are carried out while reading out the records one after another.

Thereafter the processings from Step 274 to Step 279 are repeated the same number of times as the number of input data sets (Step 273). The input pin number section 824 and the input data classifying section 826 in the instruction node information record are read out (Step 274). In the case where the input data classifying section indicates 'INPUT DATA ARE INPUTTED DIRECTLY' (Step 275), the input data source section 827 is extracted (Step 276) and the information of the input data source section 827 is set in the input data source section 224 (Step 277). In the case where the input data classifying section indicates 'INPUT DATA ARE TAKEN OVER BETWEEN INSTRUCTION NODES' (Step 275), the arc number stored in the input data source section 827 is extracted (Step 278). Then the arc information record corresponding to the arc number and the start instruction identification number 833 and the output pin number 834 in the arc information record are set in the input data source section 224 according to the expression format described previously (Step 279).

When the processing is terminated for the input data, the processing is effected for the control tokens. The following processings are repeated the same number of times as the number of control tokens. The arc number stored in the input data source section 827 corresponding to the control token is extracted (Step 281) and the arc information record corresponding to the arc number is obtained. Then the start instruction identification number 833 and the output pin number 834 are set in the control token source section 226 according to the expression format described previously (Step 282). When the processing of the editing table is terminated for the control tokens, the procedure returns to the processing for extracting the succeeding instruction node information record (Step 280). Then, when the editing processing of the editing table is terminated for all the instruction nodes (Step 271), the instruction. identification number, the instruction name, the input data, and the connection information of the control tokens are read out and they are transformed into the wiring table according to the format indicated in FIG. 7 (Step 283).

Figure 12:
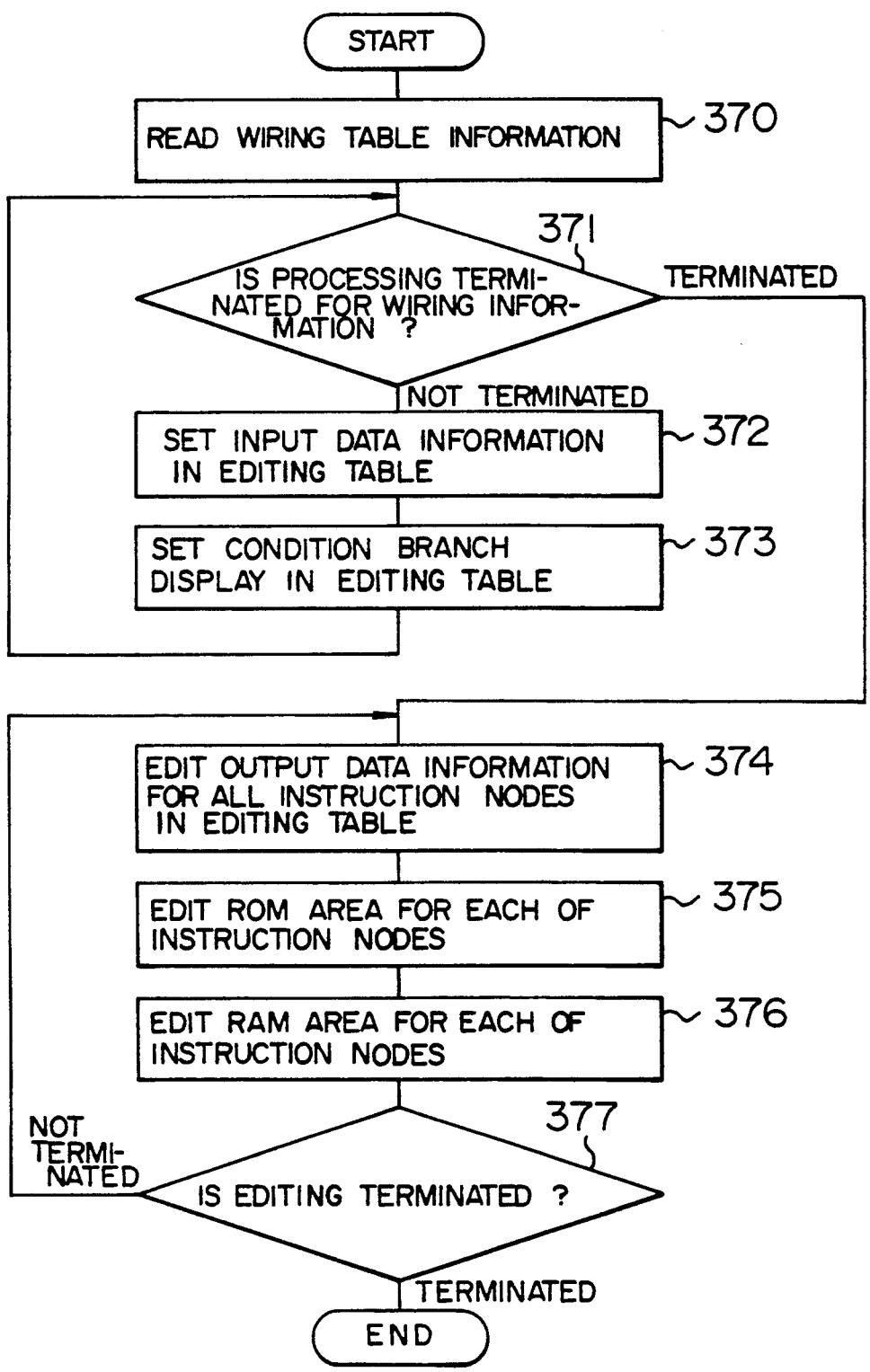
FIG. 12 is a scheme showing an example of the processing flow of the compile section.

Next the processing in the compile section 300 generating instruction templates from the wiring table will be explained referring to FIGS. 10, 11 and 12.

FIG. 10 shows an example in which the wiring table expressed in text indicated in FIG. 2 is constructed with the instruction templates 310 generated by the compile section 300. These instruction templates 310 are described in machine language and arranged on one side of the main memory (not shown in the figure) in the processing apparatus 20 for every instruction node. Each of the instruction template 310 is composed roughly of two parts. The first part is an information area (Read Only Memory: hereinbelow called a ROM area) which is never rewritten in the course of the execution of the instruction, and the second part is an information area (Random Access Memory: hereinbelow called a RAM area) which is rewritten in the course of the execution of the instruction.

The first part is composed of a RAM area address section 320 for making linkage with the RAM area; an instruction name section 321; a condition branch displaying section 322; an input data set number section 323; an input data classifying section 324; an input data source section 325; an output data set number section 326; an output data destination number section 327; and an output data destination section 328.

Concerning the method for obtaining the input data, since in the present embodiment the input data are read out, when the instruction becomes executable, it is not necessary to prepare an area for the input data in the RAM area. Consequently, although the source of the input data indicated by the input data source section 325 is represented by the instruction identification number and the output pin number of the source, an address in the output data storing area, which can be calculated directly unequivocally from the instruction identification number and the output pin number, may be indicated. In the same way, although the destination indicated by the output data destination section 28 is represented by the instruction identification number, the heading address of the instruction template may be specified directly. Here it is supposed from the point of view of performance that the input data source section 325 is expressed by addresses and that the output data destination section 328 is expressed by the instruction identification number of the destination.

The second part is composed of an input data arrival counter 330 representing the number of input data sets which have arrived at the instruction; an output pin number displaying section 331 displaying the output pin number through which the data are outputted in the case where the instruction is of the condition branch type; and an output storing area 332 storing the output data. Further, although the same number of output data storing area 332 as the number of output data sets is prepared in the case where the instruction is of the condition branch type, since the output data are outputted through one output pin, one output data storing area is sufficient. The input data arrival counter 330 decreases its content by 1 every time one data set arrives, and when the content becomes 0, it means that the input data necessary for the execution of the instruction have been prepared. Further, this input data arrival counter 330 is initially set at a predetermined value before the execution of the program. Since the instruction templates from ②  to ⑤ have structures similar to that of the instruction template ⓪, explanation thereof will be omitted.

Since the wiring table inputted in the compile section 300 is described in a form in which the output pins are referred to from the input pins, it is not suitable for dealing with the connection information of the output pins. Therefore a table for editing the connection information between the input pins and the output pins is necessary for every instruction.

FIG. 11 shows an example of the structure of the editing table/which is composed of instruction identification number section 350; an instruction name section 351; a condition branch displaying section 352; an input data set number section 353; an input data classifying section 354; an input data source section 355; an output data set number section 356; an output pin number section 357; an output destination number section 358; an output destination section 359; a control token number section 360; and a control token source section 361. The same number of input data source sections 355 as the number of input pins are disposed. The input data classifying section 354 specifies whether the input data have a format which can be inputted directly, such as letters, numerals, etc., or they are indicated by the instruction identification number and the output pin number. It is sufficient that this input data classifying section 354 has one bit for one input data set. Further, the output destination number section 358 and the output destination section 359 are disposed for every output pin and the instruction identification number is stored in the output destination section 359. It is sufficient to prepare an address transforming table in order to find the address of the instruction template from the instruction identification number.

Now the processing flow by which the compile section 300 generates the instruction template from the editing table will be explained, referring to FIG. 12.

At first, the wiring table is read out in unit of the instruction identification number (Step 370). After it has been judged whether there exists the wiring table or not (Step 371), information is set for the instruction identification number section 350, the instruction name section 351, the input data set number section 353, the input data classifying section 354, the input data source section 355, the control token number section 360, and the control token source section 361 in the editing table by using the wiring table thus read in (Step 372). Then it is judged on the basis of the instruction name whether the instruction node is a condition branch instruction or not an indication representing this fact is set in the condition branch displaying section 353 (Step 373). Thereafter the procedure returns again to the processing for reading out the wiring table.

When the reading of the entire wiring table is terminated, the connection information for the output pins is edited. At first, using one of the instruction identification numbers as the reference, this connection information of the output pins refers to the input data source section 355 and the control token source section 361 corresponding to that instruction identification number and sets the instruction identification number serving as the reference described previously in the output destination section 359 corresponding to the instruction identification number and the output pin number stored in the input data source section 355 and the control token source section 361 referred to. This processing is effected for the input data source sections 355 and the control token source sections 361 corresponding to all the instruction identification numbers to obtain the number of output pins and the output destinations and respective values are set in the output data set number section 356 and the output destination number section 358 (Step 374). Then, for one instruction node indicated by the instruction identification number, the input source address is calculated on the basis of the assignment of the RAM area, the input instruction identification number of the input data source and the output pin and the ROM area of the instruction template is edited from the instruction name, the condition branch, the input data classification, the number of output data sets and the number of output destinations (Step 375). The size of the output data storage area is determined from the number of output data sets and the RAM area of the instruction template is prepared (Step 376). If there remain instruction nodes for which the processing is not yet terminated, the procedure returns to the processing 374 (Step 377).

When the preparation of the instruction template is terminated for all the instruction nodes, the processing in the compile section 300 is terminated.

FIG. 13 is a scheme showing an example of the structure of an instruction executing section 400. The instruction executing section 400 is composed of an instruction execution control section 410 which controls the execution of the instruction template 310 generated by the compile section 300 on the basis of the data driven principle; a calculating section 420 dealing with calculations indicated by the instruction name; and a waiting queue section 430 for making instructions which have become executable simultaneously, wait for execution. Here it is supposed that the program begins the execution starting from the instruction whose instruction identification number is 1, and that the execution of the program is terminated when there remain no more instructions registered in the waiting queue section 430. In this waiting queue section 430 are registered the instruction identification numbers of the instructions waiting for the execution. Here it is supposed that data for which the heading address of the instruction template is determined unequivocally by the instruction identification number are prepared, although it is not described in detail.

Figure 14:
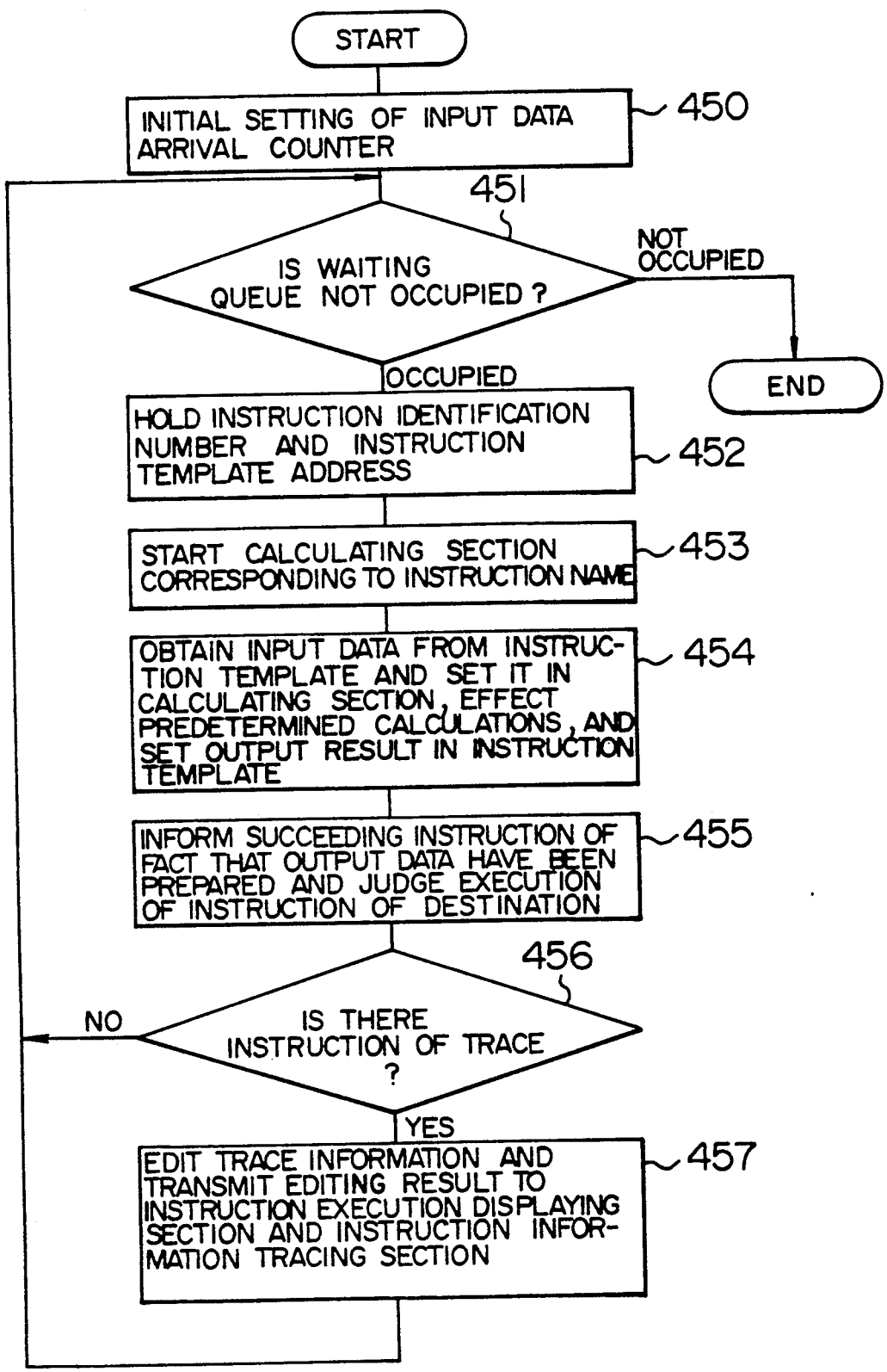
FIG. 14 is a scheme showing an example of the processing flow of the instruction executing section.

FIG. 14 shows an example of the processing flow of the instruction executing section 400. The operation of the instruction execution is effected as follows.

At first, the instruction execution control section 410 sets initially the input data arrival counter 330 of the instruction template of the program which is the execution object at a predetermined initial value (Step. 450).

The instruction execution control section 410 judges whether there exist instruction nodes waiting for the instruction execution (Step 451). If there exist instruction nodes in the waiting queue, the instruction identification numbers for the instructions waiting for the execution are extracted. Then the heading address of the instruction template 310 corresponding to each of the instruction identification numbers is obtained. The instruction execution control section 410 holds the instruction identification numbers and the heading addresses of the instruction templates, which are obtained (Step 452).

The instruction execution control section 410 extracts the instruction name from the instruction name section 321 in the instruction template 310 and transmits the object of execution, the heading address of the instruction template and the control to the calculating section 420 corresponding to the instruction name (Step 453 ).

The calculating section 420 which has received the control effects predetermined calculations corresponding to the instruction name. That is, it obtains the input data while referring to the input data set number section 323, the input data classifying section 324 and the input data source section 325 within the instruction template 310 indicated by the heading address of the instruction template 310; effects predetermined calculations for those input data; and stores the result thus obtained in a predetermined output data storing area 332 while referring to the output data set number section 326 and the RAM area address section 320. Further, in the case where data are outputted through a predetermined output pin depending on the calculation result, the number of the output pin is stored in the output pin number displaying section 331 and the output data is stored in the output data storing area 332. Thereafter the control is returned again to the instruction execution control section 410 (Step 454).

The instruction execution control section 410 which has received the control informs the succeeding instruction of the fact that the output data are prepared while referring to the instruction identification number which has been held, as well as the output data destination number section 327 and the output data destination section 328 in the instruction template 310 indicated by the heading address of the instruction template. This information is carried out by obtaining the heading address of the corresponding instruction template from the extracted instruction identification number, after having extracted the succeeding instruction identification number stored in the output data destination section 328, for every output data set, and decreasing the value of the input data arrival counter 330 in the RAM area indicated by the RAM area address section .320 in the instruction template by 1.

As a result, if the value of the input data arrival counter 330 is 0, it is judged that all the input data necessary for the instruction execution have been gathered, i.e. that the instruction execution is possible, and the instruction identification number is registered in the waiting queue section 430. Further, if the command is a condition branch instruction according to the condition branch displaying section 322, the output pin number is extracted from the output pin number displaying section 31 and according to the output data destination number section 327 and the output data destination section 328 corresponding to the output pin number the succeeding instruction is informed thereof by the method of information described previously (Step 455).

Since a graphic data driven program contains a plurality of process routes, instruction tracing is usually carried out for each processing route. Therefore, these processing routes are used as identifying means. More specifically, an identifier, such as a processing route identifying number, for example, is given to each processing route.

In the case where the request of tracing the instruction is instructed by a processing route identification number from the terminal 10 (Step 456), the instruction execution control section 410 collects input data while referring to the input data set number section 323, the input data classifying section 324, and the input data source section 325 indicated within the instruction template in the course of the processing, and at the same time it gathers output data while referring to the RAM area address section 320, the condition branch displaying section 322, the output data set number section 326, the output data destination number section 327, the output data destination section 328, the output pin number displaying section 331 and the output data storing area 332. Then, concerning the instruction which is to be executed, the number of input data sets, the input data, the number of output data sets, the output data, the condition branch display, the output pin number, the output data destination, the processing route identification number and the instruction identification number are transmitted to the instruction execution displaying section 500 and the instruction information tracing section 600 (Step 457).

The processing steps from 451 to 455 described above are repeated until the waiting queue section 243 becomes completely free. When it is completely free, it is judged that there remain no more instructions which are to be executed, and the processing of the program is terminated.

Next, the operation of the instruction execution displaying section 500 and the instruction execution tracing section 600 in the case where there is an instruction of the trace will be explained. The instruction execution displaying section 500 displays on the screen of the terminal the instructions which have been executed, and the results thereof have been transmitted to the arc.

Figure 15:
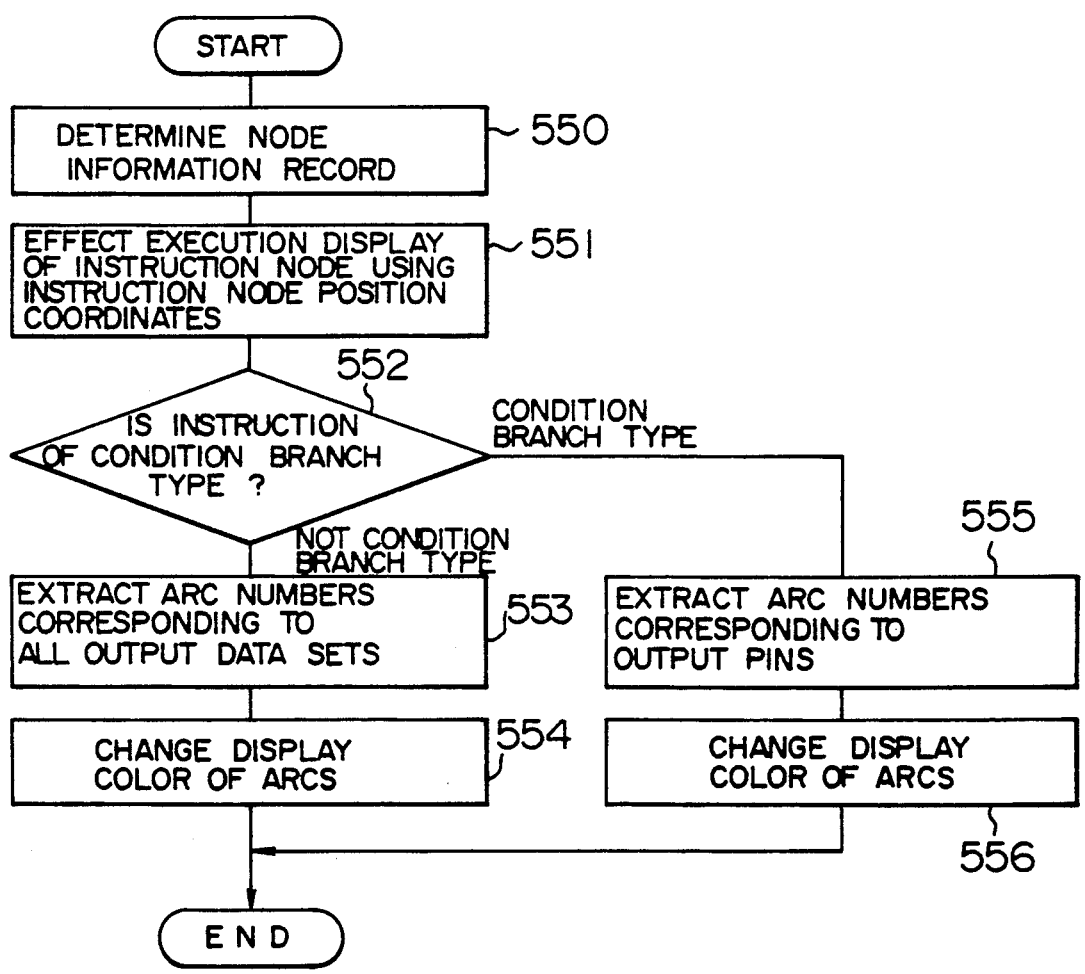
FIG. 15 is a scheme showing an example of the processing flow of the instruction execution displaying section.

At first, operation flow of the instruction execution displaying section 500 will be explained referring to FIG. 15.

The instruction execution displaying section 500 determines the node information record of the instruction which has been executed in the intermediate file 800 by using the processing route identification number and the instruction identification number of the executed instruction (Step 550). Then it is displayed on the screen of the terminal 10, e.g. by changing the color of the instruction, that the instruction node has been executed, by using the graphic pattern classifying section 817 and the instruction node position coordinate section 818 in the node information record (Step 551).

It is judged whether the instruction node is of condition branch type or not (Step 552). If it is not of condition branch type, the number of output destinations is obtained from the output destination number section 823 in the instruction node information record and the same number of arc numbers stored in the output destination section as the number of destinations are obtained (Step 553). Then the arc numbers thus obtained are transformed into coordinate information of arcs stored in the arc start position coordinate section 837 and the arc termination position coordinate section 838 in the arc information record. The display color of the arcs is changed according to the arc classifying section 832 representing the classification of lines of the arcs and it is displayed on the screen of the terminal 10 that the data have been outputted (Step 554).

On the other hand, if the instruction node is of condition branch type, the output data destination number section 823 and the output data destination section 830 in the node information record corresponding to the output pin number taken over from the instruction executing section 400 are obtained and the same number of arc numbers stored in the output destination section 830 as the number of destinations are obtained (Step 555). Then coordinate information of arcs stored in the arc start position coordinate section 837 and the arc termination position coordinate section 838 in the arc information record is obtained from the arc numbers thus obtained. The display color of the arcs is changed according to the arc classifying section 832 representing the classification of lines of the arcs and it is displayed on the screen of the terminal 10 that the data have been outputted (Step 556).

The series of display operations described above are effected every time one instruction node is executed.

The instruction information tracing section 600 stores the instruction information gathered by the instruction executing section 400 in the trace information file 900.

FIGS. 16A and 16B show an example of the record format of the trace information file 900.

As indicated in FIG. 16A, the header information record is composed of a record identifying section 910; a program name section 911; a processing route identification number section 912 in the program; an instruction record number section 912; an instruction record number section 913; and a termination displaying section 914. Further, as indicated in FIG. 16B, the instruction execution node information record is composed of a record identifying section 910; an instruction identification number section 915; an output pin number section 916; an input data set number section 917; an input data section 918; an output data set number section 919; an output data section 920; and a termination displaying section 914.

The correct data base 950 indicated in FIG. 1 is disposed for verifying the process of the execution of the traced instructions, and correct trace information which is verified for every function of the program is stored therein. This trace information can be identified by the processing route identification numbers. The record format of the trace information stored in the correct data base 950 is completely identical to the trace information file 900 indicated in FIGS. 16A and 16B.

Figure 17:
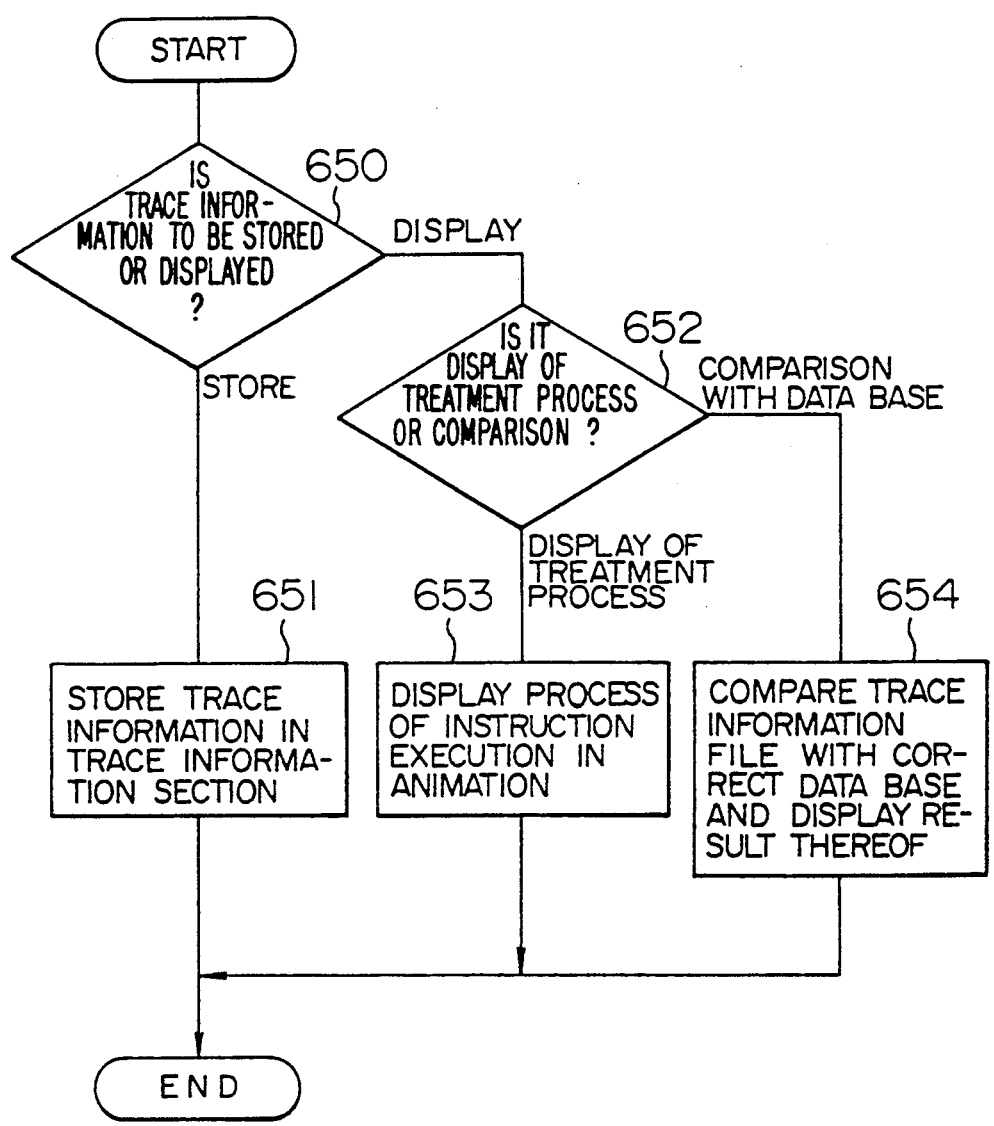
FIG. 17 is a scheme showing an example of the processing flow of the instruction information tracing section.

Next the processing flow of the instruction information tracing section 600 will be explained referring to FIG. 17.

By a processing request to the instruction information tracing section 600, the instruction executing section 400 is instructed to store the trace information and it is instructed through the terminal 10 to display the trace information.

At first, the instruction information tracing section 600 distinguishes whether the processing request is to store the trace information or to display it (Step 650).

In the case where the processing request is storing, the information taken over from the instruction executing section 400 according to the order of the instruction execution, i.e. the function number, the instruction identification number, the output pin number and the output data, are stored in a predetermined area of the trace information file 900 indicated by the function number and the instruction record number 913 is updated (Step 651).

On the other hand, in the case where the processing request is display, it is determined whether it is display of the treatment process of the instruction execution or comparison With the correct data base (Step 652). In the case where it is display of the treatment process of the instruction execution, the content of the instruction information record stored in the trace information file 900 is read out according to the function number indicated through the terminal 10 and the treatment process of the instruction execution is displayed according to the order of storing of the record. The displaying is effected as follows. The instruction node information record and the arc information record stored in the intermediate file 800 are obtained by using the instruction identification number 915 and the output pin number 916 and the process of the instruction execution is displayed in animation by a method similar to that performed by the instruction execution displaying section 500 (Step 653).

On the other hand, in the case where the comparison with the correct data base is instructed, the trace information file 900 is compared with the correct data base 950 record by record in the order of the storage of the records. In the case where the records are not in accordance with each other, the record information in the correct data base 950 and the record information in the trace information file 900 are displayed at a predetermined position of the terminal 10 (Step 654).

As described above, by using the present method for supporting development of graphic data driven programs and the apparatus for realizing the same, it is possible to support the graphic description consistently from program design to testing.

By using the method for supporting development of graphic driven programs and the apparatus for realizing the same according to the present invention, since it is possible to provide a supporting environment which consistent from the program design to testing, increase in the design efficiency and production of high quality software are possible. In this case, if the control flow and the data flow in the program are displayed in animation, a remarkable effect can be obtained for understanding the operation of the program.

Further, since the method for supporting development of graphic data driven programs and the apparatus for realizing the same is provided with an intermediate information in text format which doesn't depend on the target machine and in addition, since the instructions have a template structure, even in the case where the target machine is changed, it is sufficient to change the compile section for transforming them into instructions which depend on the target machine and the instruction executing section. Therefore, it is possible to easily deal with modifications of programs and the present invention can be widely applied in the information processing field.

What is claimed is:

1. A computer-implemented method for supporting development of graphic data driven programs comprising the steps of:

preparing a graphic data driven program representing a program operation desired by a designer by means of a graphic editor;

inputting said graphic program thus prepared into a computer;

displaying said graphic program on a display device in said graphic editor;

transforming said graphic program into a test form program which does not depend on a target machine;

transforming said text form program into instructions which are not executed by said target machine until all input data necessary for executing said instructions is available;

executing each of said executable instructions obtained by the transformation when respective input data is available; and displaying results of the execution each of said executable instructions superposed on the displayed graphic program;

wherein said graphic data driven program is described by using nodes, each of said notes represents an instruction; directed arcs indicating a data flow between instruction nodes; input pin numbers indicating a position of input data; output pin numbers indicating a position of output data; a name representing a function of each of said instruction nodes; instruction identification numbers for identifying specified instructions among a plurality of instructions; and data names and numerical values inputted directly in the instructions;

wherein the step of transforming said text form program into instructions includes the step of transforming said text form program into instruction templates described in a language which depends on the target machine, the instruction templates corresponding to the instructions and including input data arrival counters; and wherein the step of executing said executable instructions includes the steps of setting, with an instruction execution control section, the input data arrival counters to predetermined initial values each representing a number of input data which are necessary for executing a respective one of the instructions, determining, with the instruction execution control section, if one of the instructions is registered in a waiting queue as being ready for execution, executing, when it is determined that one of the instructions is registered in the waiting queue, with a calculating section, a calculation indicated by the instruction template of the registered instruction based on input data for the registered instruction to obtain output data for the registered instruction.

decrementing by one, with the instruction execution control section, the input data arrival counter for one of the instructions succeeding the registered instruction which is to receive as input data the output data for the registered instruction, and registering in the waiting queue, with the instruction execution control section, the succeeding instruction when the input data arrival counter for the succeeding instruction has been decremented to a count value of zero.

2. The method for supporting development of graphic data driven programs according to claim 1, further comprising a step of storing in advance graphic information including a shape of the instruction nodes and numbers of input and output data sets for every instruction.

3. The method for supporting development of graphic data driven programs according to claim 2, wherein said input step includes a step in which said designer inputs instruction names and arrangement points of instruction nodes on said display device.

4. The method for supporting development of graphic data driven programs according to claim 3, wherein said step of preparing a graphic data driven program includes the steps of:

determining sizes of the instruction nodes by using the shape of said instruction nodes and the numbers of input and output data sets corresponding to said inputted instruction names stored in advance;

adding said instruction names, input pin numbers, and output pin numbers to said inputted arrangement points on said display device to arrange said instruction nodes having the sizes thus determined;

inputting the instruction identification numbers and the data inputted directly in said instruction nodes by using a series of letters and/or numerals; and specifying the directed arcs representing the data flow between different instruction nodes by using the output pin numbers of the instruction nodes located at starting points of said directed arcs and the input pin numbers of instruction nodes located at ending points of said directed arcs.

5. The method for supporting development of graphic data driven programs according to claim 1, wherein said step of transforming said graphic program into said text form program includes the steps of:

transforming said graphic program inputted in said computer into an intermediate file including graphic information having a display position on said display device, a shape, the name and input data for every instruction node and directed arc; and transforming said graphic program into a wiring table in text expression form which does not depend on said target machine on the basis of said intermediate file, said wiring table being said text form program.

6. The method for supporting development of graphic data driven programs according to claim 5, wherein said wiring table is described with the instruction identification number, the name of said instruction node, and connection information for input and output pins.

7. The method for supporting development of graphic data driven programs according to claim 5, wherein said step of transforming said text form program into said instruction templates includes the step of transforming said wiring table into said instruction templates.

8. The method for supporting development of graphic data driven programs according to claim 7, wherein said instruction execution control section, said calculation section, and said waiting queue are implemented by said computer.

9. The method for supporting development of graphic data driven programs according to claim 8, wherein said step of displaying execution results includes the steps of:

obtaining said graphic information stored in said intermediate file by using each instruction identification number in order to display the process of the execution of said instruction templates; and displaying on said display device whether each of said instructions has been executed.

10. The method for supporting development of graphic data driven programs according to claim 8, further comprising the steps of:

storing information including an order of execution of the instructions collected in the course of the execution of said instruction templates and output data of each of said instructions in another file; and displaying the order of execution and the output data on said display device based on the information stored in the another file in response to an instruction from said designer.

11. The method for supporting development of graphic data driven programs according to claim 1, further comprising the steps of:

storing in advance information on an order of execution of the instructions and output data of said instructions in another file for every function of the program as correct data;

collecting said information for every function for comparison with said correct data in a case where the program is modified; and informing said designer whether every function works correctly, thereby enabling said designer to verify the program.

12. An apparatus for supporting development of graphic data driven programs comprising:

a terminal device for inputting a data driven program described in graphic form for displaying said inputted data driven program on a display device;

input transforming means coupled to said terminal device for preparing an intermediate file including information including an instruction number for identifying an instruction from said data driven program for every instruction, a shape and position coordinates of graphic symbols and line segments representing said instruction displayed on said display device, input and output data of said instruction, numbers of input and output data sets of said instruction, and wiring indicating a flow of tokens between different instructions, wiring table transforming means coupled to said input transforming means for transforming said inputted data driven program into a wiring table of instructions expressed in text by using said information stored in said intermediate file;

compile means coupled to said wiring table transforming means for transforming said wiring table of instructions expressed in text into instruction templates described in an already existing language;

instruction executing means coupled to said compile means for executing said instruction templates obtained from said compile means such that each of the instructions corresponding to said instruction templates is not executed until all input data necessary for executing each of said instructions is available;

instruction execution displaying means coupled to said instruction executing means for receiving the instruction number of an executed instruction every time an instruction is executed from said instruction executing means, obtaining from said intermediate file position coordinates and the shape of segments indicating a flow of instructions and tokens from said instruction number, and displaying on said display device the fact that said instruction has been executed and that a token has been outputted to a flow of output tokens of said instruction; and instruction information tracing means coupled to said instruction executing means for receiving the instruction number of an executed instruction and trace information of input and output data from said instruction executing means every time an instruction is executed, storing said trace information, and displaying the stored trace information on said display device in response to an instruction from said terminal device;

wherein the instruction templates include input data arrival counters; and wherein the instruction executing means includes means for setting the input data arrival counters to predetermined initial values each representing a number of input data which are necessary for executing a respective one of the instructions, means for determining if one of the instructions is registered in a waiting queue as being ready for execution, means for executing, when it is determined that one of the instructions is registered in the waiting queue, a calculation indicated by the instruction template of the registered instruction based on input data for the registered instruction to obtain output data for the registered instruction, means for decrementing by one the input data arrival counter for one of the instructions succeeding the registered instruction which is to receive as input data the output data for the registered instruction, and means for registering in the waiting queue the succeeding instruction when the input data arrival counter for the succeeding instruction has been decremented to a count value of zero.

13. The apparatus for supporting development of graphic data driven programs according to claim 12, wherein said input transforming means has an instruction information data base in which information of at least the number of input data sets, the number of output data sets, an instruction classification indicating whether an instruction is a condition branch instruction is stored in advance for every instruction and which is provided with functions of accessing the instruction information data base corresponding to an inputted instruction of said inputted data driven program every time an instruction is inputted or after all instructions have been inputted, verifying whether said information of said instruction is correct or not, and displaying errors, if there are any, at a position where said instruction of said inputted data driven program is displayed on said display device.

14. The apparatus for supporting development of graphic data driven programs according to claim 12, wherein said input transforming means displays separately instructions which have been executed and instructions which have not been executed.

15. The apparatus for supporting development of graphic data driven programs according to claim 12, wherein said instruction information tracing means has a data base in which an order of execution of the instructions and correct data for input data for each of the instructions which have been executed are stored for every function of said data driven program, and when functions are added to said program or functions thereof are modified, said instruction information tracing means verifies whether the trace information of the instructions collected for every function is in accordance with the correct data stored in the data base and displays the result of the verification on said display device.

* * * * *